C. H. TRUE & C. A. W. BRANDT.
METHOD OF MAKING RETURN BENDS.
APPLICATION FILED MAR. 24, 1917.
1,255,355.
Patented Feb. 5, 1918.
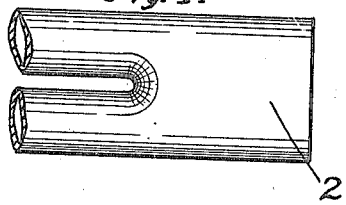
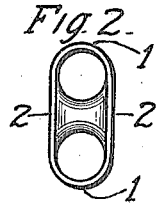
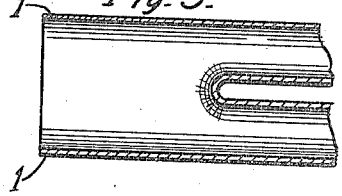
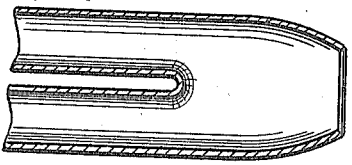
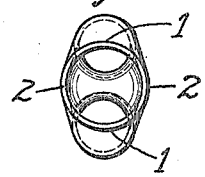
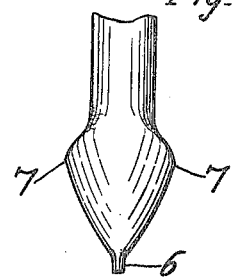
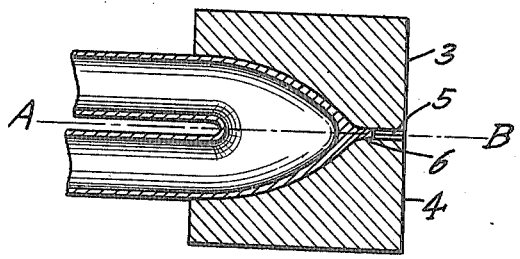
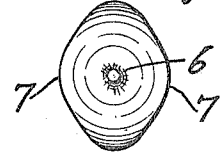
Charles H. True
& Carl A. W. Brandt Inventors
By their Attorney O. V. Thiele Charles H. True
& Carl A. W. Brandt  Inventors
By their Attorney
O. V. Thiele.

UNITED STATES PATENT OFFICE.

CHARLES H. TRUE, OF HAMMOND, INDIANA, AND CARL A. W. BRANDT, OF BAYSIDE, NEW YORK, ASSIGNORS TO LOCOMOTIVE SUPERHEATER COMPANY, OF NEW YORK, N. Y., A CORPORATION OF DELAWARE.

METHOD OF MAKING RETURN-BENDS.

1,255,355.     Specification of Letters Patent.     Patented Feb. 5, 1918.

Application filed March 24, 1917. Serial No. 157,237.

*To all whom it may concern:*

Be it known that we, CHARLES H. TRUE, a citizen of the United States, residing at Hammond, Indiana, and CARL A. W. BRANDT, likewise a citizen of the United States, residing at Bayside, New York, have invented certain new and useful Improvements in Methods of Making Return-Bends, of which the following is a specification.

Our invention relates, as just stated, to the art of making return bends. More particularly it relates to the art of making that type of return bends in which the end portions of the two pipes to be joined are themselves fashioned into such a return bend, so that the return bend and the two pipes joined by it all constitute one integral structure.

There are perhaps other ways of making such return bends, but the one on which the present invention constitutes an improvement is one described in Patents 1,155,110 and 1,169,209, both granted jointly to C. H. True and N. T. McKee. The latter of these two patents sets forth in detail particularly the first part of the process, which results in an incomplete bend, one specific way of completing it being described in the former patent. The present invention starts with the incomplete pipe bend as made by the process of Patent 1,169,209 or its equivalent, but in completing the structure departs in some material respects from the method described in 1,155,110.

The object of the present invention may then be stated as the providing of an improved method of closing and shaping the end of a return bend of the class referred to.

The invention will be readily understood from the following description which is to be read in connection with the accompanying drawings. In these drawings—

Figure 9:
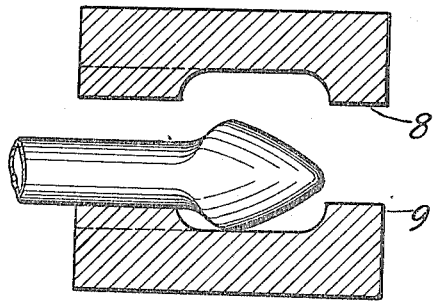
Figure 10:
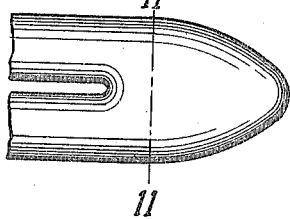
Figure 11:
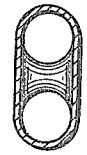
Figure 12:
Figure 13:
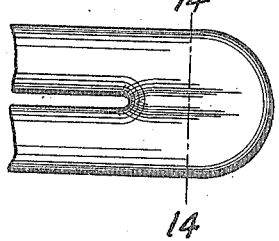
Figure 14:
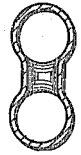
Figure 15:
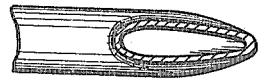

Figure 1 represents an incomplete return bend of the kind to which the present method is to be applied; Fig. 2 represents an end view of the same, and Fig. 3 a section taken axially through both pipes; Fig. 4 represents, in section, the incomplete bend after the present process has been partly performed on it; Fig. 5 being an end view of the same; Figs. 6, 7 and 8 show the bend after the process has been carried a step farther, Fig. 7 showing also, in section, the two dies in which the process is performed. Fig. 9 shows the bend in the press about to be given its final shape. Figs. 10, 11, and 12 are views of the completed bend, Fig. 11 being a sectional view taken on line 11—11 of Fig. 10 looking toward the left, while Figs. 13, 14 and 15 are views of a modification of the final form, Fig. 14 being a sectional view taken on line 14—14 of Fig. 13, looking toward the left.

The incomplete bend illustrated in Figs. 1, 2 and 3 is seen to comprise two pipe ends united for a certain distance from their ends by a transverse passage. The walls of this passage have been made from the material of the pipes themselves by the process described in Patent 1,169,209, referred to above. The pipe bend is incomplete, the pipes and connecting passage being still open at the end as shown.

In the process for closing the bend as described in Patent 1,155,110 and as hitherto practised, the first step is the insertion of a specially shaped tool into the open end of the bend, giving the bend a shape merging gradually from circular at the open end into the more or less nearly elliptical section near the bottom of the connecting channel. For certain reasons this step is objectionable and the present method eliminates it. Instead of inserting such an expanding member the open end of the incomplete bend is heated and given a circular contour by blows delivered at the appropriate portions on the outside of the bend near its end, viz. at and near the points designated by the reference numerals 1. The resultant shape is illustrated in Figs. 4 and 5. The blows that force the portions 1 inwardly at the same time force the portions at and about points 2 outwardly, so that the extreme end is given a circular form. This preliminary shaping can be done by means separate and different from the means used for the next succeeding step or it may be done by the same means and in such a way that the two really form one continuous and single operation.

The drawing down or swaging of the end to a point as shown in Figs. 6, 7, and 8 is preferably done on a rotary swaging machine. The form of this well-known type of machine need not be here described. It is sufficient to say that in it two symmetrical dies 3 and 4 of Fig. 7, whose effective surfaces are the counterpart of the shape it is desired to give the end of the return bend, alternately close and open in the direction toward and from the axis A—B, at the same time rotating about this axis. The mechanism is such that there are eight or ten opening and closing movements per revolution, though the machine may be modified to give some other number. The two dies are shown in Fig. 7 in their closed or innermost position. The incomplete pipe bend is firmly clamped in some feeding device of any prefered construction after having first been raised to a forging heat. It is then moved toward and into the die. As it enters farther and farther the end is swaged down to conform to the interior surface of the die, finally assuming a shape such as shown in Fig. 7. The portions designated by reference numeral 2 in Fig. 2 have simultaneously bulged outward so that the other views of the bend are as shown in Figs. 6 and 8. The die is made with an axial hole 5, into which any excess of metal can extrude, as at 6. This excess can be removed later on if desired. The present method, it will be noticed, does away with the final welding formerly necessary, since no cleft or opening of any kind is left at the end of the bend after the swaging operation, the excess of metal just spoken of being really a solid piece of metal without any axial opening whatever.

The bend is now a completely operative article, but for certain purposes it is objectionable to have the portions marked 7—7 protrude beyond the two imaginary parallel lanes tangent to both pipes. To bring these portions within these limits the bend is again heated and then placed in a press, diagrammatically indicated in Fig. 9. The effective surfaces of this press are so shaped that the form given to the bend is that shown in Figs. 10, 11, and 12. This part of the process may be done in one or in several stages, as desired. In the latter case as many sets of dies will be used as there are stages, each set approaching the desired finished form more closely, up to the last set, which is the precise counterpart of the form the bend is to have.

If desired, the bend can, by giving the effective surfaces of the press the proper contour be given some other shape, such as that illustrated in Figs. 13, 14, and 15, where a section on line 14—14 is 8-shaped. This completed form, it will be noted particularly from Figs. 11, 12, 14 and 15, has no portions of its walls extending beyond the limits spoken of above, and its external appearance differs in no material respect from the form of the completed bends described in the two patents hereinabove referred to.

It is manifest that certain variations are possible without departing from the spirit of the claims.

What we claim is—

1. The process of completing a pipe bend of the class referred to which comprises applying pressure on its outside near the open end so as to give the end a circular contour, swaging down said end so it is closed, and finally shaping said bend.

2. The process of completing a pipe bend of the class referred to which comprises applying pressure on its outside near the open end so as to give the end a circular contour, swaging down the bend so it is closed and a part of the metal adjacent to the end forms a relatively short solid bar, removing a portion of this bar, and finally shaping said bend.

3. The process of completing a pipe bend of the class described which comprises delivering blows on the appropriate portions of the outside thus closing the end to a substantially conically shaped point, portions of the structure extending beyond the parallel planes tangent to both pipes; and then flattening the bend until said portions lie within said parallel planes.

4. The process of completing a pipe bend of the class described which comprises shaping it by blows on the appropriate portions of its outside so as to give its end a circular contour, swaging it down so that it is closed and a certain amount of the metal adjacent to the end is in the form of a relatively short, solid, cylindrical piece and that portions of the pipe bend extend beyond the parallel planes tangent to both pipes, removing a part of the solid cylindrical piece, and flattening the end until all portions lie within said planes.

CHARLES H. TRUE.
CARL A. W. BRANDT.

Witnesses for C. H. True:
  C. A. MASSARD,
  H. R. THOMPSON.
Witnesses for C. A. W. Brandt:
  JAMES K. SCOTT,
  B. R. BRISTOL.